Patented Oct. 31, 1944

2,361,612

UNITED STATES PATENT OFFICE 2,361,612

CATALYST FOR THE ISOMERIZATION OF OLEFINS

Harry E. Drennan, Bartlesville, Okla., assignor to Phillips Petroleum Company, a corporation of Delaware No Drawing. Application September 27, 1940, Serial No. 358,734

6 Claims. (Cl. 252—216)

This invention relates to a process for the catalytic isomerization of olefinic hydrocarbons, and more specifically to a novel catalyst and process for the conversion of alpha olefins to beta olefins in hydrocarbon mixtures in the vapor phase at elevated temperatures.

Alpha olefins generally referred to as 1-olefins undergo an isomerization reaction whereby the unsaturated linkage migrates toward the center of the carbon chain and beta or 2-olefins are formed. In the case of normal butene, this reaction may be represented by the equation,

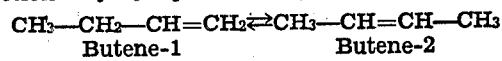

| Butene-1 | Butene-2 |

The isomers thus represented are identical in many of their chemical properties but differ rather widely in some physical characteristics. The 1-olefins for example are lower-boiling than either the 2-olefins or the corresponding paraffin hydrocarbons. This quality of butene-1 causes it to complicate the separation steps of processes producing or utilizing $C_4$ olefins, diolefins or iso-olefins since the boiling point of butene-1 is practically the same as that of isobutene and butadiene. Thus butene-1 may appear as a contaminant in isobutene or butadiene fractions prepared by distillation, and processes involving the recovery of butenes from $C_4$ mixtures are subject to difficulties and losses since an appreciable portion of said butenes may be present as an isomer lower-boiling than the normal paraffin.

On the basis of these and other considerations it is often desirable to have the normal olefins as completely as possible in either the alpha or the beta form, and for many processes the latter form is preferable. Inability to bring about this conversion or isomerization has led in some cases to the employment of complex chemical separation and/or solvent extraction methods for the segregation of components of a hydrocarbon mixture.

The reaction which converts alpha olefins to beta olefins has been found to be of the time-equilibrium type. In other words butene-1 is converted gradually into butene-2 or vice versa until the concentration of the respective components reaches the equilibrium concentrations noted in the following table of equilibria at various temperatures.

| Temperature, °F. | Concentration in mol per cent | |
|---|---|---|
| | Butene-1 | Butene-2 |
| 80 | 2.9 | 97.1 |
| 260 | 7.7 | 92.3 |
| 440 | 13.7 | 86.3 |
| 620 | 19.8 | 80.2 |
| 980 | 30.3 | 69.7 |
| 1,340 | 38.5 | 61.5 |

From this tabulation it is seen that at high temperatures maximum amounts of butene-1 are formed, while the maximum concentrations of butene-2 are formed at low temperatures. Also, while only about 40 per cent conversion to butene-1 is possible, 97 per cent conversion to butene-2 is possible if equilibrium can be reached at very low temperatures. Since the extent of conversion of one isomer to the other depends on the isomerization reaction velocity and on the time allowed for the reaction, it is evident that in any commercial operation equilibrium concentrations are attainable only when suitable treating conditions can be met.

Isomerization by thermal methods is unsatisfactory because the slow rate of reaction at low temperature levels prevents appreciable conversion of butene-1 to butene-2. Attempts also have been made to control the rate of isomerization reaction by means of catalysts and to thus obtain extensive conversion of butene-1 to butene-2 at relatively low temperatures. The difficulty with previous catalytic processes has been that the less active catalysts required too high temperatures with the result that butene-2 concentrations were limited, while the more active catalysts concurrently promoted polymerization reactions which resulted in excessive losses of olefins and other reactive components of hydrocarbon mixtures undergoing isomerization.

I have now discovered a novel catalyst for the isomerization of butene-1 which is active at such conditions of temperature and flow rate that equilibrium concentrations of butene-2 are obtained with negligible losses of olefins and diolefins through polymer formation.

I have found that when inert substances such as petroleum or coal coke are impregnated with a mixture of phosphorus pentoxide and a high-melting petroleum tar, an active catalyst is produced for the isomerization of 1-olefins at low temperatures.

The catalyst support is prepared by crushing and screening petroleum or coal coke which is porous but only slightly adsorbent to a desirable size such as $^{3}/_{16}$ mesh. This sized coke is then thoroughly mixed with a definite weight of commingled phosphorus pentoxide and powdered tar, and the total mixture is heated to a temperature of 600 to 750° F. for a period of time sufficient to carbonize the tar.

The tars which I use in preparing my catalyst are usually those residual materials obtained in the thermal treatment of petroleum oils such as reduced tars from cracking operations and the like. Such tars have a high melting point usually above about 160° F., and can be powdered by grinding at atmospheric temperatures. This powdered tar when mixed with phosphorus pentoxide powder forms a non-hygroscopic mixture suitable for application to the coke carrier. As the mixture is heated, the tar liquefies and the plastic mass is uniformly distributed over the surfaces and throughout the pores of the coke particles. The tar thus acts as a binder and dispersion agent whereby the phosphorus pentoxide is distributed in powder form throughout the carrier material.

With continued heating at 600–750° F. the liquid tar is gradually converted to solid coke, but due to the uniform distribution of the formerly plastic material, the binding action of the tar is retained, and high percentages of phosphorus pentoxide are thereby held on the supporting coke. The function of the tar is of great importance since without this material the hygroscopic phosphorus pentoxide would rapidly absorb moisture and could not be successfully distributed over or retained by the carrier. Also, much larger quantities of the phosphorus pentoxide are incorporated in the catalyst than would be possible in the absence of the tar binder.

While other catalyst supports may be used in place of coke, I find that coke is particularly well suited to the preparation of the catalyst because of its porous structure characterized by rather large pores for the retention of the plastic tar mixture. Also, the final conversion of the tar to solid coke yields a catalyst of uniform composition and physical properties not subject to shattering and deterioration caused by abrupt temperature changes.

The use of high melting point tar also contributes to the formation of a superior catalyst, because the tar may be powdered for admixture with the phosphorus pentoxide, then liquefied for the uniform distribution of the mixture, and finally converted to solid form in the finished catalyst. The temperature range of carbonization is not critical but it is desirable to obtain relatively slow conversion of the tar at temperatures somewhat below those giving extremely rapid carbonization.

The amount of phosphorus pentoxide incorporated in the catalyst may be varied over a rather wide range. As little as three per cent by weight is effective, while up to 50 per cent may be applied to the carrier. Usually 3 to 30 per cent yields a satisfactory catalyst, and the activity of the catalyst increases with the proportion of phosphorus pentoxide up to about 20 per cent by weight. Since the activity of the catalyst governs the temperature of operation and/or the flow rate of reactants over the catalyst, I prefer to use catalysts containing 15–25 per cent of phosphorus pentoxide. The amount of tar necessary in preparing the catalyst is usually between 30 and 100 per cent of the weight of the phosphorus pentoxide to be added.

In the operation of the process of my invention, a hydrocarbon mixture containing butene-1 is heated to a temperature in the range of 200–600° F. or higher and passed in vapor phase over a catalyst containing 10–25 per cent or more of phosphorus pentoxide. The flow rate of hydrocarbon vapors is maintained at a value which gives maximum conversion to butene-2 without appreciable formation of heavy polymers, usually between 0.5 and 5 liquid volumes of feed per hour per volume of catalyst.

The flow rate and temperature of any specific operation may be adjusted to the activity of the catalyst according to the factors previously described as affecting the conversion. Thus, as the activity of the catalyst is increased, the rate of isomerization is increased, or equivalent conversion may be obtained at a lower temperature or a higher flow rate. Low temperatures are desirable in view of the high equilibrium concentrations of butene-2 attainable, while higher flow rates suppress polymerization reaction. In general, the proper choice of operating conditions within the optimum temperature range of 200 to 600° F. will be apparent in view of the foregoing disclosure.

Pressures in my process are low super-atmospheric pressures of zero to 100 pounds gage. Higher pressures favor polymerization reactions, although they may be used in certain instances such as the admixture of a diluent in the olefinic mixtures undergoing treatment.

The catalytic treatment of my invention is applicable to substantially pure 1-olefins or to hydrocarbon mixtures containing 1-olefins in varying concentrations and from any source such as the dehydration of alcohols or the like or the dehydrogenation and/or pyrolysis of suitable hydrocarbon materials.

The effluents from my process containing equilibrium concentrations of 2-olefins may be treated subsequently in any desired fashion to separate and utilize said olefins such as concentration by distillation or by chemical methods followed by further dehydrogenation, polymerization or the like. If desired, the hydrocarbon mixtures following removal or utilization of 2-olefins may be returned for further isomerization treatment until the 1-olefin content is substantially completely utilized. Or additional 1-olefins may be produced in the mixture by suitable means prior to successive isomerization treatments.

The following example will serve to illustrate one method of preparing my catalyst and one specific application of said catalyst to the isomerization of butene-1. However, since the number of modifications might be greatly multiplied, this example is not to be construed as a limitation of my invention.

*Example I*

One part of powdered tar having a melting point of 175° F. was intimately mixed with two parts of powdered phosphorus pentoxide. This mixture was applied to 3/14 mesh petroleum coke in an amount equal to 20 per cent by weight of the coke. The resulting mixture was slowly heated to 675° F. and maintained at this temperature for 30 minutes until the tar in the mixture became converted to solid coke.

The finished catalyst was placed in a suitable reaction chamber and butene-1 was passed through at a temperature of 275° F. and at a flow rate of 0.8 liquid volume of butene per hour per volume of catalyst. The effluent gas contained about 92 per cent of butene-2 and 8 per cent of butene-1, while about one per cent of the charge was converted to a liquid polymer.

*Example II*

When pentene-1 is passed over coke impregnated with 30 per cent by weight of phosphorus pentoxide, with the temperature of treatment at 400° F. and a flow rate of 1.0 liquid volume of pentene per hour per volume of catalyst, the $C_5$ fraction of the effluents contains 75 per cent of pentene-2, and 10 per cent of the charge is recovered as high-boiling polymer.

Having thus described and illustrated my invention, I claim:

1. The method of preparing a catalyst comprising admixing powdered anhydrous phosphorus pentoxide with powdered solid high melting point tar in the proportions of 30 to 100 parts tar per 100 parts phosphorus pentoxide, admixing the resulting mixture with particulate coke in proportions such that the phosphorus pentoxide is present in amounts of from 15 to 25 weight percent of the aggregate mass, and heating said mass to a temperature in the range of 600 to 750° F. for a period of time sufficient to convert said tar to coke.

2. The process of making an improved catalyst which comprises thoroughly mixing a major proportion of crushed porous coke with a minor proportion of a mixture of powdered anhydrous phosphorus pentoxide and powdered solid high-melting point tar and heating the resulting mixture to an elevated temperature for a period of time sufficient to carbonize said tar.

3. The process of making an improved catalyst which comprises thoroughly mixing a major proportion of crushed porous coke with a minor proportion of a mixture of powdered anhydrous phosphorus pentoxide and powdered solid high-melting point tar having a melting point above 160° F., and heating the resulting mixture to an elevated temperature between 600 and 750° F. for a period of time sufficient to carbonize said tar.

4. A catalyst prepared by the method of claim 1.
5. A catalyst prepared by the process of claim 2.
6. A catalyst prepared by the process of claim 3.

HARRY E. DRENNAN.